(12) United States Patent
Black et al.

(10) Patent No.: US 10,333,219 B2
(45) Date of Patent: Jun. 25, 2019

(54) ANTENNA SYSTEMS AND RELATED METHODS FOR SELECTING MODULATION PATTERNS BASED AT LEAST IN PART ON SPATIAL HOLOGRAPHIC PHASE

(71) Applicant: Searete LLC, Bellevue, WA (US)

(72) Inventors: Eric J. Black, Bothell, WA (US); Brian Mark Deutsch, Snoqualmie, WA (US); Alexander Remley Katko, Bellevue, WA (US); Melroy Machado, Seattle, WA (US); Jay Howard McCandless, Alpine, CA (US); Yaroslav A. Urzhumov, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 422 days.

(21) Appl. No.: 15/282,964

(22) Filed: Sep. 30, 2016

(65) Prior Publication Data
US 2018/0097286 A1   Apr. 5, 2018

(51) Int. Cl.
*H01Q 3/34* (2006.01)
*H01Q 21/06* (2006.01)
*H04L 27/00* (2006.01)

(52) U.S. Cl.
CPC .............. *H01Q 3/34* (2013.01); *H01Q 21/06* (2013.01); *H04L 27/00* (2013.01)

(58) Field of Classification Search
CPC .............. H01Q 21/293; H01Q 21/065; H01Q 15/0066; H01Q 3/34
USPC ........................................... 375/295; 342/368
See application file for complete search history.

(56) References Cited

U.S. PATENT DOCUMENTS

| | | |
|---|---|---|
| 2015/0109181 A1 | 4/2015 | Hyde et al. |
| 2015/0236412 A1 | 8/2015 | Bily et al. |
| 2015/0288063 A1 | 10/2015 | Johnson et al. |
| 2016/0233588 A1* | 8/2016 | Bily ........................ H01Q 25/00 |

(Continued)

FOREIGN PATENT DOCUMENTS

WO   WO 2015/196044 A1   12/2015

OTHER PUBLICATIONS

PCT International Search Report; International App. No. PCT/2018/027773; dated Jul. 27, 2018; pp. 1-4.

*Primary Examiner* — Kevin Kim

(57) ABSTRACT

Antenna systems and related methods are disclosed. An antenna system includes an antenna controller configured to operably couple to an array of electromagnetic (EM) scattering elements. The controller is configured to determine a performance parameter of the antenna system for a plurality of different combinations of different spatial holographic phases and effective mode indices having different modulation patterns corresponding thereto, and select one of the modulation patterns based on the performance parameter corresponding thereto. A method includes storing data indicating a modulation pattern determined based on a spatial holographic phase and an effective mode index for each of a plurality of different main beam angles from the antenna, and controlling the antenna to operate with a main beam pointed in each of the plurality of different main beam angles by controlling the antenna to operate in each modulation pattern corresponding to the plurality of main beam angles.

40 Claims, 5 Drawing Sheets

(56) References Cited

U.S. PATENT DOCUMENTS

2016/0261043 A1\* 9/2016 Sazegar ................ H01Q 3/34
2018/0097286 A1\* 4/2018 Black .................... H01Q 3/34

\* cited by examiner

ANTENNA SYSTEMS AND RELATED METHODS FOR SELECTING MODULATION PATTERNS BASED AT LEAST IN PART ON SPATIAL HOLOGRAPHIC PHASE

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc. applications of the Priority Application(s)).

PRIORITY APPLICATIONS

None

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

DETAILED DESCRIPTION

Figure 1:
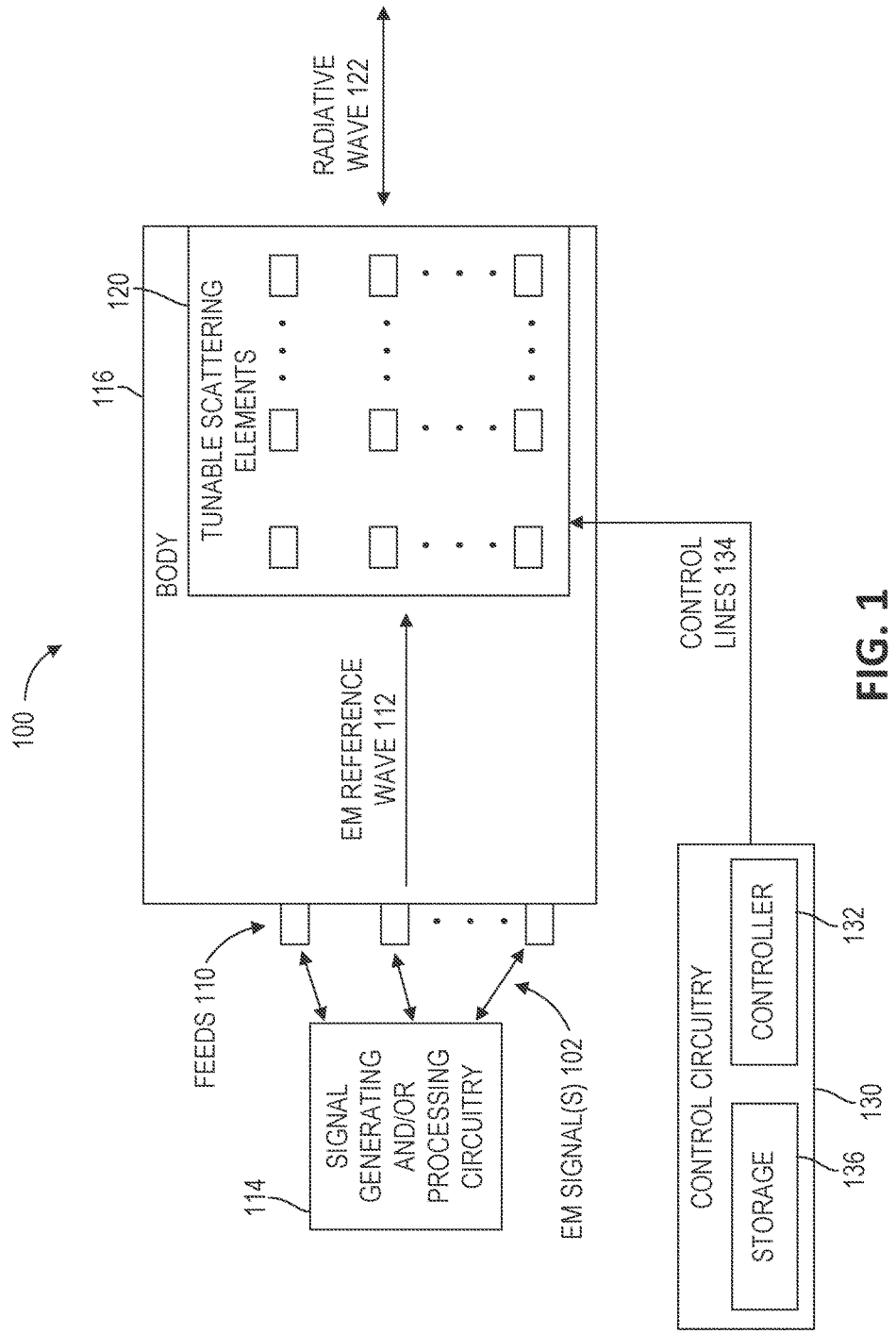
FIG. 1 is a simplified block diagram of an antenna system, according to some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Embodiments of the disclosure include antenna systems and related methods for operating an antenna in a modulation pattern selected based, at least in part, on a performance parameter for a plurality of different combinations of spatial holographic phases and effective mode indices of the antenna.

Various features disclosed herein may be applied alone or in combination with others of the features disclosed herein. These features are too numerous to explicitly indicate herein each and every other one of the features that may be combined therewith. Therefore, any feature disclosed herein that is practicable, in the view of one of ordinary skill, to combine with any other one or more others of the features disclosed herein, is contemplated herein to be combined. A non-exhaustive list of some of these disclosed features that may be combined with others of the disclosed features follows.

For example, in some embodiments, an antenna system includes an antenna controller configured to operably couple to control inputs of an array of electromagnetic (EM) scattering elements having sub-wavelength spacing. The antenna controller is configured to control the array of EM scattering elements, through the control inputs, to operate according to modulation patterns. The antenna controller is also configured to determine a performance parameter of the antenna system for a plurality of different combinations of different spatial holographic phases and effective mode indices, each of the plurality of different combinations having a different one of the modulation patterns corresponding thereto. The antenna controller is further configured to select one of the modulation patterns based, at least in part, on the performance parameter corresponding thereto.

In some embodiments, an antenna system includes a body configured to propagate an EM reference wave, and EM scattering elements configured to scatter an EM reference wave to produce an EM radiative wave.

In some embodiments, an antenna system is disclosed, wherein EM scattering elements are spaced at less than about one half of a wavelength of an operational frequency of the antenna system.

In some embodiments, an antenna system is disclosed, wherein EM scattering elements are spaced at less than about one fourth of a wavelength of an operational frequency of the antenna system.

In some embodiments, an antenna system includes a feed configured to deliver a reference wave to a body.

In some embodiments, an antenna system includes signal generating circuitry configured to operably couple to and deliver a signal to a feed, the signal configured to excite a reference wave on or in a body of an antenna.

In some embodiments, an antenna system includes a feed configured to deliver a reference wave from a body to signal processing circuitry.

In some embodiments, an antenna system includes signal processing circuitry.

In some embodiments, an antenna system is disclosed, wherein EM scattering elements are arranged in a single one-dimensional arrangement.

In some embodiments, an antenna system is disclosed, wherein EM scattering elements are arranged in a plurality of one-dimensional arrangements.

In some embodiments, an antenna system is disclosed, wherein an antenna controller is configured to analyze effective mode indices as a combination of effective mode indices for each of a plurality of one-dimensional arrangements of EM scattering elements.

In some embodiments, an antenna system is disclosed, wherein an antenna controller is configured to analyze effective mode indices as a combination of effective mode indices for separate subgroups of EM scattering elements of an array of EM scattering elements.

In some embodiments, an antenna system is disclosed, wherein an antenna controller is configured to determine a performance parameter for a plurality of different combinations of different spatial holographic phases and effective mode indices while optimizing a loss parameter of the effective mode indices.

In some embodiments, an antenna system is disclosed, wherein an antenna controller is configured to store, in a data storage device, data indicating a spatial holographic phase and the effective mode index that corresponds to a selected one of modulation patterns.

In some embodiments, an antenna system is disclosed, wherein an antenna controller is configured to store data indicating spatial holographic phase and effective mode index corresponding to a selected one of modulation patterns for a plurality of different main beam directions from an array of EM scattering elements, and steer a main beam by operating the array of EM scattering elements in modulation patterns corresponding to spatial holographic phase and the effective mode index corresponding to the plurality of different main beam directions.

In some embodiments, an antenna system is disclosed, wherein an antenna controller is configured to store data indicating a selected one of modulation patterns for a plurality of different main beam directions from an array of EM scattering elements, and steer a main beam by operating the array of EM scattering elements in the selected modulation patterns.

In some embodiments, an antenna system is disclosed, wherein an antenna controller is configured to steer a main beam generated by a plurality of EM scattering elements based on a selected modulation pattern in at least substantially real-time.

In some embodiments, an antenna system is disclosed, wherein the antenna controller is configured to determine each modulation pattern in at least substantially real-time.

In some embodiments, an antenna system is disclosed, wherein a performance parameter is an antenna gain in a predetermined direction from an array of EM scattering elements.

In some embodiments, an antenna system is disclosed, wherein a performance parameter is a gain of a highest-gain side lobe.

In some embodiments, an antenna system is disclosed, wherein a performance parameter is a beamwidth of a main lobe of an antenna at half of a maximum gain of a main lobe.

In some embodiments, an antenna system is disclosed, wherein a performance parameter is a received power received by the antenna system.

In some embodiments, an antenna system is disclosed, wherein a performance parameter is a bit error rate of communications received by the antenna system.

In some embodiments, an antenna system is disclosed, wherein a performance parameter is a data rate of communications received by the antenna system.

In some embodiments, an antenna system is disclosed, wherein a performance parameter is a received signal to noise ratio of signals received by the antenna system.

In some embodiments, an antenna system is disclosed, wherein a performance parameter is a uniformity with which a radiative wave is scattered by an array of EM scattering elements.

In some embodiments, an antenna system includes a data storage device. The data storage device includes a database stored thereon, the database including data indicating a modulation pattern determined based, at least in part, on a spatial holographic phase and an effective mode index of a body of an antenna for each of a plurality of different main beam angles from the antenna. The body includes a plurality of electromagnetic (EM) scattering elements having sub-wavelength spacing. The antenna system also includes an antenna controller operably coupled to the data storage device. The antenna controller is configured to operably couple to control inputs of the antenna and operate the antenna in modulation patterns. The antenna controller is programmed to control the antenna to operate with a main beam pointed in each of the plurality of different main beam angles by controlling the antenna to operate in each modulation pattern corresponding to the plurality of different main beam angles as correlated in the database. The modulation pattern for each of the plurality of different main beam angles is selected, based at least in part on a performance parameter of the antenna system for different combinations of the spatial holographic phase and the effective mode index.

In some embodiments, a method of operating an antenna system is disclosed. The method includes controlling an array of electromagnetic (EM) scattering elements having sub-wavelength spacing to operate according to modulation patterns, and determining a performance parameter of the antenna system for a plurality of different combinations of different spatial holographic phases and effective mode indices. Each of the plurality of different combinations has a different one of the modulation patterns corresponding thereto. The method also includes selecting one of the modulation patterns based, at least in part, on the performance parameter corresponding thereto.

In some embodiments, a method of operating an antenna system is disclosed. The method includes propagating an EM reference wave with a body, and scattering the EM reference with the EM scattering elements to produce an EM radiative wave.

In some embodiments, a method of operating an antenna system is disclosed, wherein controlling an array of EM scattering elements comprises controlling EM scattering elements that are spaced at less than about one half of a wavelength of an operational frequency of the antenna system.

In some embodiments, a method of operating an antenna system is disclosed, wherein controlling an array of EM scattering elements comprises controlling EM scattering elements that are spaced at less than about one fourth of a wavelength of an operational frequency of the antenna system.

In some embodiments, a method of operating an antenna system is disclosed. The method includes delivering a reference wave to a body with a feed.

In some embodiments, a method of operating an antenna system is disclosed, wherein delivering a reference wave to a body with a feed includes delivering a signal to the feed, the signal configured to excite the reference wave on or in the body.

In some embodiments, a method of operating an antenna system is disclosed, wherein controlling an array of EM scattering elements includes controlling an array of EM scattering elements arranged in a single one-dimensional arrangement.

In some embodiments, a method of operating an antenna system is disclosed, wherein controlling an array of EM scattering elements comprises controlling an array of EM scattering elements arranged in a plurality of one-dimensional arrangements.

In some embodiments, a method of operating an antenna system is disclosed. The method includes analyzing effective mode indices as a combination of effective mode indices for a plurality of one-dimensional arrangements.

In some embodiments, a method of operating an antenna system is disclosed. The method includes analyzing effective mode indices as a combination of effective mode indices for separate subgroups of EM scattering elements of an array of EM scattering elements.

In some embodiments, a method of operating an antenna system is disclosed, wherein determining a performance parameter of the antenna system includes determining the performance parameter for a plurality of different combinations of different spatial holographic phases and effective mode indices while optimizing a loss parameter of the effective mode indices.

In some embodiments, a method of operating an antenna system is disclosed. The method includes storing, in a data storage device, data indicating spatial holographic phase and effective mode index that correspond to a selected one of modulation patterns.

In some embodiments, a method of operating an antenna system is disclosed, wherein storing data indicating spatial holographic phase and effective mode index that corresponds to a selected one of modulation patterns includes storing data indicating spatial holographic phase and effective mode index corresponding to the selected one of the modulation patterns for a plurality of different main beam directions from an array of EM scattering elements, and steering the main beam by operating the array of EM scattering elements in modulation patterns corresponding to the spatial holographic phase and the effective mode index corresponding to the plurality of different main beam directions.

In some embodiments, a method of operating an antenna system is disclosed, wherein storing data indicating a spatial holographic phase and an effective mode index that corresponds to a selected one of modulation patterns includes storing data indicating the selected one of the modulation patterns for a plurality of different main beam directions from an array of EM scattering elements, and steering the main beam by operating the array of EM scattering elements in the selected modulation patterns.

In some embodiments, a method of operating an antenna system is disclosed. The method includes steering a main beam generated by a plurality of EM scattering elements based on a selected modulation pattern in at least substantially real-time.

In some embodiments, a method of operating an antenna system is disclosed, wherein selecting one of modulation patterns based, at least in part, on a performance parameter includes selecting the one of the modulation patterns based, at least in part, on an antenna gain in a predetermined direction from an array of EM scattering elements.

In some embodiments, a method of operating an antenna system is disclosed, wherein selecting one of modulation patterns based, at least in part, on a performance parameter includes selecting the one of the modulation patterns based, at least in part, on a gain of a highest-gain side lobe.

In some embodiments, a method of operating an antenna system is disclosed, wherein selecting one of modulation patterns based, at least in part, on a performance parameter includes selecting the one of the modulation patterns based, at least in part, on a maximum gain of the main lobe.

In some embodiments, a method of operating an antenna system is disclosed, wherein selecting one of modulation patterns based, at least in part, on a performance parameter includes selecting the one of the modulation patterns based, at least in part, on a received power received by the antenna system.

In some embodiments, a method of operating an antenna system is disclosed, wherein selecting one of modulation patterns based, at least in part, on a performance parameter includes selecting the one of the modulation patterns based, at least in part, on a bit error rate of communications received by the antenna system.

In some embodiments, a method of operating an antenna system is disclosed, wherein selecting one of modulation patterns based, at least in part, on a performance parameter includes selecting the one of the modulation patterns based, at least in part, on a data rate of communications received by the antenna system.

In some embodiments, a method of operating an antenna system is disclosed, wherein selecting one of modulation patterns based, at least in part, on a performance parameter includes selecting the one of the modulation patterns based, at least in part, on a received signal to noise ratio of signals received by the antenna system.

In some embodiments, a method of operating an antenna system is disclosed, wherein selecting one of modulation patterns based, at least in part, on a performance parameter includes selecting the one of the modulation patterns based, at least in part, on a uniformity with which a radiative wave is scattered by the array of EM scattering elements.

In some embodiments, a method of operating an antenna system is disclosed. The method includes determining a modulation pattern based, at least in part, on a spatial holographic phase and an effective mode index of a body of an antenna for each of a plurality of different main beam angles from the antenna. The body includes electromagnetic (EM) scattering elements having sub-wavelength spacing. The method also includes storing data indicating the determined modulation pattern, and controlling the antenna to operate with a main beam pointed in each of the plurality of different main beam angles by controlling the antenna to operate in each modulation pattern corresponding to the plurality of different main beam angles. The modulation pattern for each of the plurality of different main beam angles is determined, based at least in part, on a performance parameter of the antenna system for different combinations of the spatial holographic phase and the effective mode index.

In some embodiments, a method of operating an antenna system is disclosed, wherein scattering the EM reference wave with the EM scattering elements comprises scattering the EM reference wave with EM scattering elements that are spaced at less than about one half of a wavelength of an operational frequency of the antenna system.

In some embodiments, a method of operating an antenna system is disclosed, wherein scattering the EM reference wave with the EM scattering elements comprises scattering the EM reference wave with EM scattering elements that are spaced at less than about one fourth of a wavelength of an operational frequency of the antenna system.

In some embodiments, a method of operating an antenna system is disclosed. The method includes delivering a signal corresponding to a reference wave to signal processing circuitry through a feed.

In some embodiments, a method of operating an antenna system is disclosed, wherein scattering an EM reference wave with EM scattering elements includes scattering the EM reference wave with EM scattering elements that are arranged in a single one-dimensional arrangement.

In some embodiments, a method of operating an antenna system is disclosed, wherein scattering an EM reference wave with EM scattering elements includes scattering the EM reference wave with EM scattering elements that are arranged in a plurality of one-dimensional arrangements.

In some embodiments, a method of operating an antenna system is disclosed, wherein determining a modulation pattern based, at least in part, on a spatial holographic phase and an effective mode index comprises analyzing the effective mode indices as a combination of effective mode indices for the plurality of one-dimensional arrangements.

In some embodiments, a method of operating an antenna system is disclosed, wherein determining a modulation pattern based, at least in part, on a spatial holographic phase and an effective mode index comprises analyzing the effective mode index as a combination of effective mode indices for separate subgroups of EM scattering elements of an array of EM scattering elements.

The method of claim 70, wherein determining a modulation pattern based, at least in part, on a spatial holographic phase and an effective mode index comprises determining a performance parameter for a plurality of different combinations of different spatial holographic phases and effective mode indices while optimizing a loss parameter of the effective mode indices.

In some embodiments, a method of operating an antenna system is disclosed. The method includes storing, in a data storage device, data indicating the selected one of the modulation patterns.

In some embodiments, a method of operating an antenna system is disclosed, wherein determining the modulation patterns comprises determining each modulation pattern in at least substantially real-time.

The principle function of any antenna is to couple an electromagnetic wave guided within the antenna's structure to an electromagnetic wave propagating in free space, and/or vice versa. Many approaches exist to implement this coupling and have been intensely studied due to the vast practical applications of antennas.

In antennas based on Metamaterial Surface Antenna Technology (MSA-T), coupling between the guided wave and propagating wave is achieved by modulating the impedance of a surface in electromagnetic contact with the guided wave. This controlled surface impedance is referred to as a "modulation pattern." The guided wave in the antenna is referred to as a "reference wave" or "reference mode," and a desired free space propagating wave pattern is referred to as a "radiative wave" or "radiative mode."

A general method for generating a modulation pattern in MSA-T is derived from holographic principles. In holography, where the surface modulation function is a hologram ($\Psi_{holo}$) formed by the beat of the reference wave ($E_{ref}$) and the desired radiative wave ($E_{rad}$). This relationship can be expressed compactly as:

$$\Psi_{holo} = \frac{E^*_{ref} E_{rad}}{|E_{ref}|^2}$$

where * is the complex conjugate operator, and |_| is the magnitude operator. This equation suggests that an optimal modulation function depends on an accuracy with which the radiative wave and reference wave are known. Examples of MSA-T antennas are described in U.S. Patent Publications 2012/0194399, 2014/0266946, 2015/0318618, 2015/0380828, 2015/0372389, 2016/0149308, 2016/0149309, 2016/0149310, and 2016/0164175, the entire disclosure of each of which is hereby incorporated herein by reference.

If both $E_{ref}$ and $E_{rad}$ are normalized, the function $\Psi_{holo}$ can take on any value in the complex plane in a circle with magnitude less than 1. Modulating elements (e.g., tunable scattering elements 120) used in typical MSA-Ts are frequently incapable of completely covering this complex unit circle. Therefore, the modulation function may be adjusted to reflect the modulation values the antenna elements can achieve. In addition, the surface is discretely sampled at fixed locations, leading a choice of modulation pattern to be a sampled approximation of a continuous modulation pattern.

Further complications arise as element spacing is reduced. Mutual coupling effects, where an individual element's response is perturbed by its neighbors, generally becomes stronger as elements are packed more densely. This manifests in a number of ways. The dispersion characteristics of the reference wave may be altered, making the pre-calculation of the ideal hologram modulation less trivial than the function $\Psi_{holo}$ suggests.

FIG. 1 is a simplified block diagram of an antenna system 100, according to some embodiments. The antenna system 100 includes an antenna including a body 116, one or more feeds 110, and tunable scattering elements 120 (which may also be referred to herein as "EM scattering elements" 120) on or in the body 116. The tunable scattering elements 120 are spaced (e.g., uniformly, non-uniformly, or a combination thereof) at subwavelength distances. By way of non-limiting example, the tunable scattering elements 120 may be spaced at less than about half of a wavelength of an operational frequency of the antenna. Also by way of non-limiting example, the tunable scattering elements 120 may be spaced at less than about one quarter of a wavelength of an operational frequency of the antenna. As used herein, the term "operation frequency" refers to a frequency or frequencies of a reference wave 112 propagating through the body 116.

Each of the tunable scattering elements 120 may include structures that are substantially electrically or magnetically polarized in response to electromagnetic fields. Various different examples of scattering elements are disclosed in U.S. Patent Publication 2010/0156573 to Smith et al. filed Aug. 21, 2009, the entire disclosure of which is hereby incorporated herein by this reference. By way of non-limiting example, the tunable scattering elements 120 may include split-ring resonators (SRRs), complementary split-ring resonators (CSSRs), electric LC (ELC) resonators, complementary electric LC (CELC) resonators, omega-shaped elements, cut-wire-pair elements, other structures that are substantially electrically or magnetically polarized in response to electromagnetic fields, and combinations thereof.

The body 116 may include any structure capable of propagating an EM reference wave 112 (e.g., a guided wave, a surface wave, etc.). By way of non-limiting example, the body 116 may include a microstrip, a waveguide (e.g., coplanar, parallel plate, closed, tubular, other waveguides, and combinations thereof), a dielectric slab, other propagating structures, and combinations thereof.

The antenna system 100 also includes signal generating and/or signal processing circuitry 114 (sometimes referred to herein simply as "signal circuitry" 114) operably coupled to the feeds 110. In some embodiments, the signal circuitry 114 is configured to deliver EM signals 102 to the feeds 110 (e.g., in a transmit operation of the antenna). In some embodiments, the signal circuitry 114 is configured to process EM signals 102 received from the feeds 110 (e.g., in a receive operation of the antenna).

The antenna system 100 further includes control circuitry 130 including a controller 132 operably coupled to the tunable scattering elements 120 through control lines 134. The controller 132 is configured to control the tunable scattering elements 120 according to modulation patterns to scatter the EM reference wave 112 propagating through the body 116. The scattering of the EM reference wave 112 generates a radiative wave 122 that propagates through the air. Accordingly, in a transmit operation, the signal circuitry 114 may provide the EM signals 102 to the feeds 110, exciting the EM reference wave 112 on or in the body 116, and the tunable scattering elements 120 may scatter the EM reference wave 112 to generate the radiative wave 122. Also, in a receive operation, the tunable scattering elements 120 may direct energy from the radiative wave 122 propagating through the air to generate the EM reference wave 112 propagating through the body 116, which may excite the EM signals 102 at the feed and deliver the EM signals 102 to the signal circuitry 114 for processing. In this way, the antenna system 100 may function as a transmitter, a receiver, a bi-directional communication device, or combinations thereof.

Each of the tunable scattering elements 120 may be configured to function in a plurality of different operational states responsive to control signals delivered to the tunable scattering elements by the controller 132 through the control lines 134. In other words, EM properties of the tunable scattering elements 120, and hence effective EM properties of the antenna (e.g., the combination of the body 116 and the tunable scattering elements 120) may be adjusted responsive to the control signals. By way of non-limiting example, the tunable scattering elements 120 may include elements that are adjustable responsive to voltage or current inputs (e.g., variable capacitors (varactors), transistors, diodes, etc.), tunable dielectric materials (e.g., ferroelectrics), elements that are adjustable responsive to optical inputs (e.g., photo-active materials), elements that are adjustable responsive to field inputs (e.g., nonlinear magnetic materials), elements that are adjustable responsive to mechanical inputs (e.g., microelectromechanical systems (MEMS), actuators, hydraulics), other adjustable elements, and combinations thereof. In some embodiments, the plurality of different states may include only two states (i.e., the tunable scattering elements 120 function in a binary form). In some embodiments, the plurality of different states may include three or more discrete states (i.e., the tunable scattering elements 120 are grayscale elements). In some embodiments, the tunable scattering elements 120 may be adjustable continuously over a continuum of operational states (in practice, however, if adjustment elements include digital to analog or analog to digital converters (DACs and ADCs, respectively), there may technically be a finite number of discrete operational states, depending on the resolution of the DACs/ADCs across the continuum).

A naïve modulation pattern for a one-dimensional MSA-T array has the form:

$$\cos\left(\frac{2\pi}{\lambda} \times (\sin(\theta) + \eta_{\mathit{eff}}) + \varphi\right),$$

where $\lambda$ is the free space wavelength, $\theta$ is the nominal angle for radiation relative to array broadside, x is the space coordinate along the array, $\eta_{\mathit{eff}}$ is the effective mode index, and $\varphi$ is a spatial holographic phase shift.

Rather than setting the spatial holographic phase $\varphi$ to zero and only selecting a modulation pattern based on the effective mode index $\eta_{\mathit{eff}}$, as in conventional systems, the controller 132 is configured to select a modulation pattern based on the spatial holographic phase $\varphi$, as well. In other words, the controller 132 is configured to select the modulation pattern based on the performance parameter as a function of both the effective mode index $\eta_{\mathit{eff}}$ and the spatial holographic phase $\varphi$.

Adjusting the spatial holographic phase $\varphi$ modifies the input impedance looking into a feed 110 of the antenna. Also, adjusting the spatial holographic phase $\varphi$ may enable the phase of the hologram to better match the phase of EM signals 102 and/or radiative waves 122. Accordingly, modifying the spatial holographic phase $\varphi$ can improve power coupling for the antenna. By contrast, optimizing a performance parameter by modifying the effective mode index $\eta_{\mathit{eff}}$ with a fixed spatial holographic phase $\varphi$ (e.g., $\varphi=0$) is not necessarily a global optimum. As a result, in some instances an optimal performance parameter may be higher by varying both the effective mode index $\eta_{\mathit{eff}}$ and the spatial holographic phase $\varphi$ than an optimal performance parameter based only on varying the effective mode index $\eta_{\mathit{eff}}$.

Other more brute-force methods of optimization have been proposed. These methods, however, attempt to explore a space that has $2^N$ (N is the number of tunable scattering elements 120) possible solutions for binary arrays and $M^N$ (M is the number of states in the grayscale value) possible solutions for grayscale arrays. In contrast, the antenna system 100 scales as A×B (where A is the number of effective mode index $\eta_{\mathit{eff}}$ values considered, B is the number of spatial holographic phase $\varphi$ values considered, and x is the multiplication operator). For example, the value A may be between 10 and 50, and B may be between 60 and 180 resulting in only up to about 9,000 combinations of the various values of effective mode index $\eta_{\mathit{eff}}$ and spatial holographic phase $\varphi$. Accordingly, exhaustive computation by the antenna system 100 may be much simpler than for prior, more brute-force methods of optimization, which may consider over $10^9$ different states for relatively small 30 element binary arrays. As a result, real-time optimization may be more plausible for the antenna system 100 than for prior, more brute-force methods.

The controller 132 is configured to at least one of determine or monitor a performance parameter of the antenna responsive to different modulation patterns (i.e., different permutations of the tunable scattering elements 120 operating in the plurality of different states). These different modulation patterns result in different effective EM properties of the antenna. By way of non-liming example, different spatial holographic phases $\varphi$ and effective mode indices $\eta_{\mathit{eff}}$ may result, depending on which modulation pattern the controller 132 controls the tunable scattering elements 120 to operate according to.

In some embodiments, the controller 132 may be configured to perform a grid search over different combinations of different effective mode indices $\eta_{\mathit{eff}}$ and spatial holographic phases $\varphi$ to select a corresponding performance parameter that is desirable for operation of the antenna system. The controller 132 may control the tunable scattering elements 120 to operate according to a modulation pattern resulting in the effective mode index $\eta_{eff}$ and the spatial holographic phase φ corresponding to the desirable performance parameter.

In some embodiments, a modulation pattern may be selected for each of a plurality of different main beam angles θ from the antenna based on a performance parameter computed as a function of both the effective mode index $\eta_{eff}$ and the spatial holographic phase φ. In such embodiments, data indicating the selected modulation pattern for each of the main beam angles may be stored in a data storage device 136 (sometimes referred to herein simply as "storage" 136). The controller 132 may then refer to the data stored in the storage 136 to determine which modulation pattern to use for a desired main beam angle and avoid exhaustively predicting or observing the performance parameter for varying values of the effective mode index $\eta_{eff}$ and the spatial holographic phase φ in real-time. In some embodiments, however, the modulation pattern may be selected in real-time, or in at least substantially real-time, where the controller 132 has adequate processing speed, storage, and power. As used herein, the term "at least substantially real-time" refers to real-time systems, but allows for inevitable computational delays in implementing real-time operations.

The performance parameter may be any performance parameter of the antenna system 100 that could be used to improve operation of the antenna system 100. By way of non-limiting example, the performance parameter may be an antenna gain in a predetermined direction from the tunable scattering elements 120, a gain of a highest-gain side lobe, a beamwidth of a main lobe of the antenna at half of a maximum gain of the main lobe, a received power received by the antenna system 100 through the antenna (e.g., in a wireless power system), a bit error rate of communications received by the antenna system 100 (e.g., in a communication system), a data rate of communications received by the antenna system 100, a received signal to noise ratio of signals received by the antenna system 100, a uniformity with which a radiative wave is scattered by the tunable scattering elements 120, some other performance parameter, or combinations thereof. In some embodiments, a loss parameter of the effective mode index $\eta_{eff}$ may be optimized.

In some embodiments, the antenna system 100 may be used for communicating wireless data with a far-end antenna (not shown). By way of non-limiting example, the antenna system 100 may be used for transmitting, receiving, and/or combinations thereof, of wireless signals (e.g., through the radiative wave 122).

In some embodiments, the antenna system 100 may be used for at least one of transmitting and receiving power wirelessly. By way of non-limiting example, a wireless power charger may include the antenna system 100 and be configured to transmit wireless power to a wirelessly powered device. Also by way of non-limiting example, a wirelessly powered device may include the antenna system 100 and be configured to receive power wirelessly from a wireless power charger.

Figure 2:
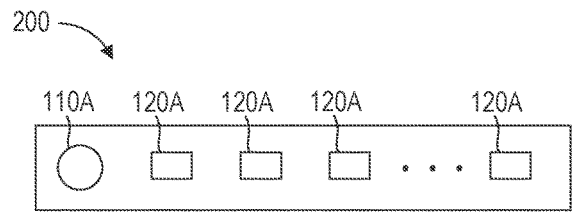
FIG. 2 is a simplified illustration of an example of an antenna, according to some embodiments.

FIG. 2 is a simplified illustration of an example of an antenna 200, according to some embodiments. The antenna 200 includes a single one-dimensional array of tunable scattering elements 120A, and a feed 110A. The tunable scattering elements 120A and the feed 110A are similar to the tunable scattering elements 120 and the feeds 110 discussed above with reference to FIG. 1.

In some embodiments, a modulation pattern for the antenna 200 may be selected based on an effective mode index and a spatial holographic phase of the entire antenna 200. In some embodiments, however, the modulation pattern may be selected based on effective mode indices and spatial holographic phases of one or more subsets of the antenna (e.g., each of the subsets may include a different portion of the tunable scattering elements 120B). In other words, the modulation pattern may be selected such that different segments of the antenna 200 may have different effective mode indices and/or spatial holographic phases associated therewith.

Figure 3:
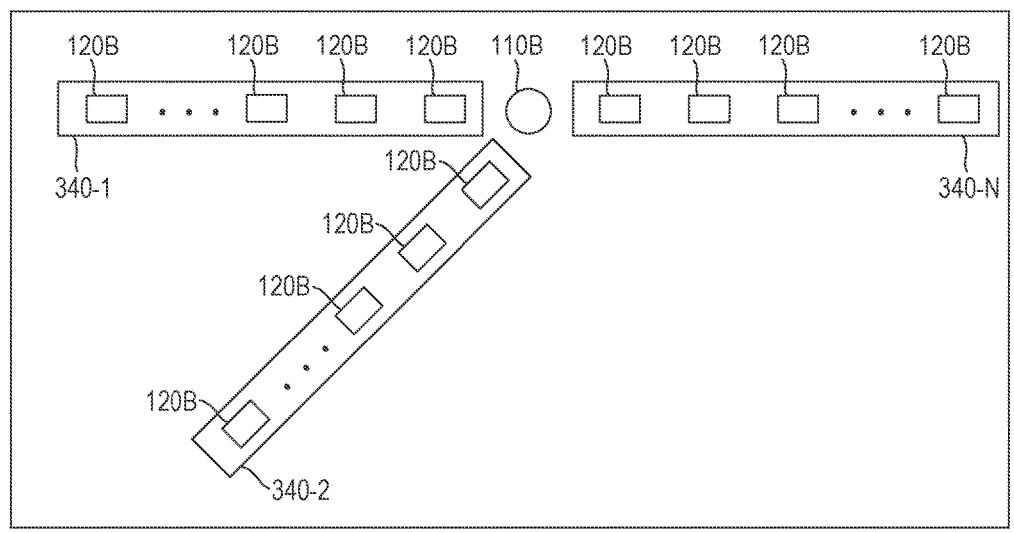
FIG. 3 is a simplified illustration of an example of another antenna, according to some embodiments.

FIG. 3 is a simplified illustration of an example of another antenna 300, according to some embodiments. The antenna 300 includes a plurality of one-dimensional arrays 340-1, 340-2, . . . , 340-N (sometimes referred to herein together as "arrays 340" and individually as "array" 340) of tunable scattering elements 120B, and a feed 110B. The tunable scattering elements 120B and the feed 110B are similar to the tunable scattering elements 120 and the feeds 110 discussed above with reference to FIG. 1.

In some embodiments, a modulation pattern for the antenna 300 may be selected based on an effective mode index and a spatial holographic phase of the entire antenna 300. In some embodiments, however, the modulation pattern may be selected based on effective mode indices and spatial holographic phases of one or more subsets of the antenna 300 (e.g., each of the subsets may include a different portion of the tunable scattering elements 120B). In other words, the modulation pattern may be selected such that the different subsets of the antenna 300 may have different effective mode indices and spatial holographic phases associated therewith.

By way of non-limiting example, each of the arrays 340 may be a different subset (i.e., a first subset includes the scattering elements 120B of array 340-1, a second subset includes the scattering elements 120B of array 340-2, and an Nth subset includes the scattering elements 120B of array 340-1). Accordingly, each array 340 within the antenna 300 may have a different effective mode index and/or spatial holographic phase associated therewith. Subdividing the antenna 300 into subsets comprising the separate arrays 340 may be advantageous because, depending on placement and orientation of the arrays 340 relative to the feeds, different arrays 340 may operate optimally in quite different sub-modulation patterns (and effective mode indices and spatial holographic phases, by extension) to produce a main beam in a desired direction.

Figure 4:
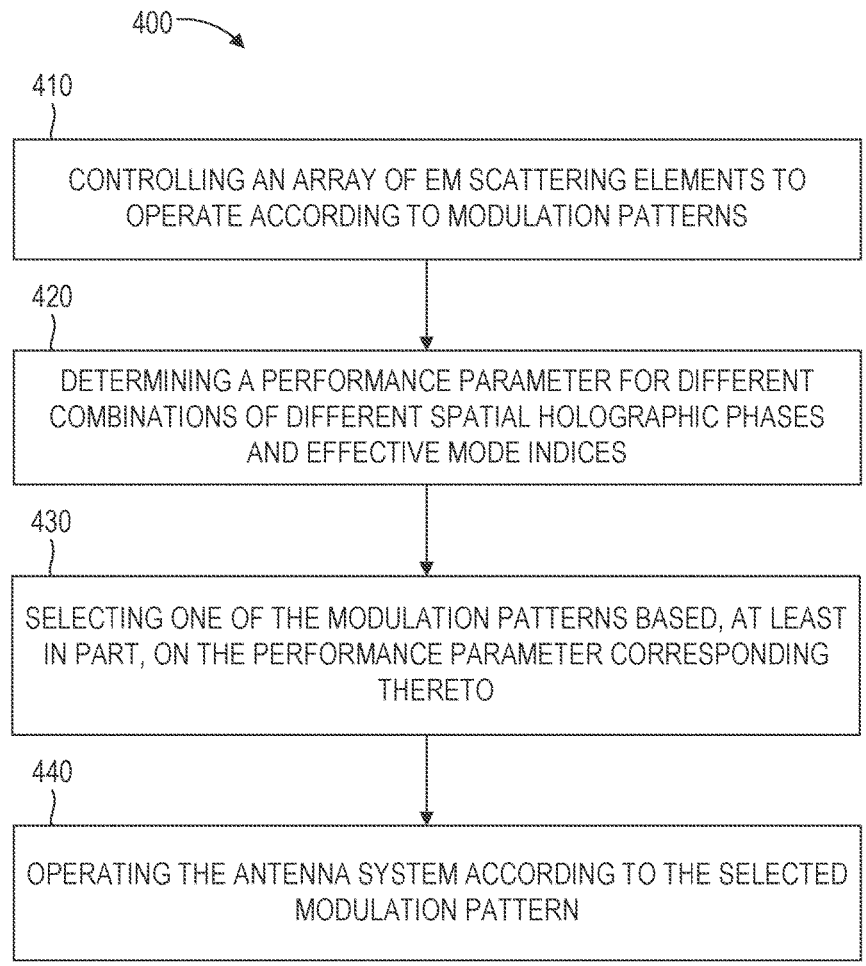
FIG. 4 is a simplified flowchart illustrating a method of operating an antenna system, according to some embodiments.

FIG. 4 is a simplified flowchart illustrating a method 400 of operating an antenna system (e.g., the antenna system 100 of FIG. 1), according to some embodiments. Referring to FIGS. 1 and 4 together, the method 400 includes controlling 410 an array (e.g., a one-dimensional array, an array of multiple one-dimensional arrays, a two-dimensional array, a three-dimensional array) of EM scattering elements 120 having sub-wavelength spacing to operate according to modulation patterns.

The method 400 also includes determining 420 a performance parameter of the antenna system 100 for a plurality of different combinations of different spatial holographic phases and effective mode indices. Each of the plurality of different combinations has a different one of the modulation patterns corresponding thereto. In some embodiments, determining 420 a performance parameter includes determining the performance parameter for the plurality of different combinations of different spatial holographic phases and effective mode indices while optimizing a loss parameter of the effective mode indices. By way of non-limiting example, the modulation patterns may be selected to cause relatively uniform radiation of the radiative wave 122. In other words, since the reference wave 112 is strongest near the feed 110, scattering elements 120 located nearer to the feed 110 may be adjusted to be less radiative than scattering elements 120 located further from the feed 110. In some embodiments, determining 420 a performance parameter includes analyzing the effective mode indices as a combination of effective mode indices for a plurality of one-dimensional arrangements of EM scattering elements 120. In some embodiments, determining 420 a performance parameter includes analyzing the effective mode indices as a combination of effective mode indices for separate subgroups of the EM scattering elements 120.

The method 400 further includes selecting 430 one of the modulation patterns based, at least in part, on the performance parameter corresponding thereto. In some embodiments, selecting 430 includes selecting the one of the modulation patterns based, at least in part, on one or more of the following performance parameters: an antenna gain in a predetermined direction from the array of EM scattering elements 120, a gain of a highest-gain side lobe, a maximum gain of the main lobe, a received power received by the antenna system 100, a bit error rate of communications received by the antenna system, a data rate of communications received by the antenna system, a received signal to noise ratio of signals received by the antenna system, a uniformity with which a radiative wave is scattered by the array of EM scattering elements, or other performance parameters.

The method 400 also includes operating 440 the antenna system 100 according to the selected modulation pattern. In some embodiments, operating 440 includes steering a main beam generated by the plurality of EM scattering elements 120 based on the selected modulation pattern in at least substantially real-time.

Figure 5:
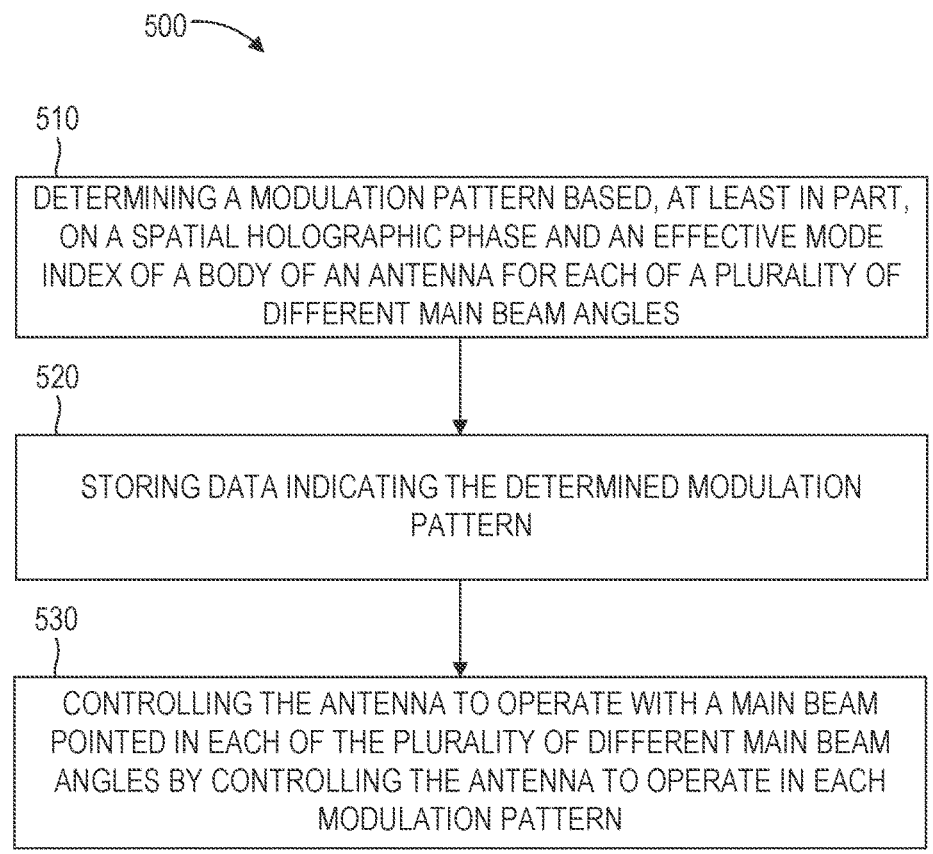
FIG. 5 is a simplified flowchart illustrating another method of operating an antenna system, according to some embodiments.

FIG. 5 is a simplified flowchart illustrating another method 500 of operating an antenna system (e.g., the antenna system 100 of FIG. 1), according to some embodiments. Referring to FIGS. 1 and 5 together, the method 500 includes determining 510 a modulation pattern based, at least in part, on a spatial holographic phase and an effective mode index of a body of an antenna for each of a plurality of different main beam angles from the antenna, the body including electromagnetic (EM) scattering elements having sub-wavelength spacing. The modulation pattern for each of the plurality of different main beam angles is determined, based at least in part, on a performance parameter of the antenna system 100 for different combinations of the spatial holographic phase and the effective mode index. In some embodiments, determining 510 includes analyzing the effective mode indices as a combination of effective mode indices for the plurality of one-dimensional arrangements. In some embodiments, determining 510 includes analyzing the effective mode index as a combination of effective mode indices for separate subgroups of the EM scattering elements 120. In some embodiments, determining 510 includes determining the performance parameter for the plurality of different combinations of different spatial holographic phases and effective mode indices while optimizing a loss parameter of the effective mode indices. In some embodiments, determining 510 includes determining each modulation pattern in at least substantially real-time. In some embodiments, determining 510 includes determining the modulation pattern based, at least in part on one or more of the following performance parameters: an antenna gain in a predetermined direction from the array of EM scattering elements 120, a gain of a highest-gain side lobe, a maximum gain of the main lobe, a received power received by the antenna system 100, a bit error rate of communications received by the antenna system, a data rate of communications received by the antenna system, a received signal to noise ratio of signals received by the antenna system, a uniformity with which a radiative wave is scattered by the array of EM scattering elements, or other performance parameters.

The method 500 also includes storing 520 data indicating the determined modulation pattern. In some embodiments, storing 520 data indicating the determined modulation pattern includes storing, in the storage 136, data indicating the spatial holographic phase and the effective mode index that corresponds to the selected one of the modulation patterns. In some embodiments, storing 520 includes storing data indicating spatial holographic phase and effective mode index corresponding to the selected one of the modulation patterns for a plurality of different main beam directions from the array of EM scattering elements 120. In some embodiments, storing 520 includes storing data indicating the selected one of the modulation patterns for a plurality of different main beam directions from the array of EM scattering elements 120.

The method 500 further includes controlling 530 the antenna to operate with a main beam pointed in each of the plurality of different main beam angles by controlling the antenna to operate in each modulation pattern corresponding to the plurality of different main beam angles.

Figure 6:
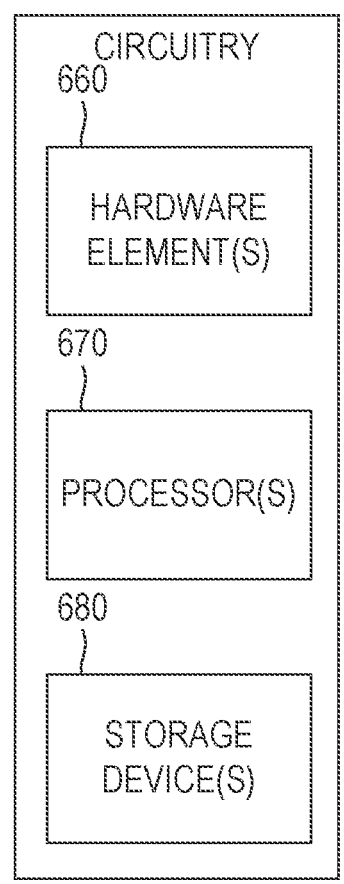
FIG. 6 is a simplified block diagram of circuitry, according to some embodiments.

FIG. 6 is a simplified block diagram of circuitry 600, according to some embodiments. The circuitry 600 may be used to implement the control circuitry 130 (FIG. 1), the signal circuitry 114 (FIG. 1), or a combination thereof. Also, the circuitry 600 may be used to implement at least a portion of the method 400 of FIG. 4, the method 500 of FIG. 5, or combinations thereof. The circuitry 600 may include at least one processor 670 (hereinafter referred to simply as "processor" 670) operably coupled to at least one data storage device 680 (hereinafter referred to simply as "storage" 680). The storage 680 may include at least one non-transitory computer-readable storage medium. By way of non-limiting example, the storage 680 may include one or more volatile data storage devices (e.g., Random Access Memory (RAM)), one or more non-volatile data storage devices (e.g., Flash, Electrically Programmable Read Only Memory (EPROM), a hard drive, a solid state drive, magnetic discs, optical discs, etc.), other data storage devices, or combinations thereof.

The storage 680 may also include data corresponding to computer-readable instructions stored thereon. The computer-readable instructions may be configured to instruct the processor 670 to execute at least a portion of the functions that the control circuitry 130 (FIG. 1), the signal circuitry 114 (FIG. 1), or a combination thereof, are configured to perform. By way of non-limiting example, the computer-readable instructions may be configured to instruct the processor 670 to execute at least a portion of the functions of at least one of the controller 132 and the signal circuitry 114 (e.g., at least a portion of the functions discussed with reference to the method 400 of FIG. 4 and/or the method 500 of FIG. 5) of FIG. 1.

The processor 670 may include a Central Processing Unit (CPU), a microcontroller, a Programmable Logic Controller (PLC), other programmable device, or combinations thereof. The processor 670 may be configured to execute the computer-readable instructions stored by the storage 680. By way of non-limiting example, the processor 670 may be configured to transfer the computer-readable instructions from non-volatile storage of the storage 680 to volatile storage of the storage 680 for execution. Also, in some embodiments, the processor 670 and at least a portion of the storage 680 may be integrated together into a single package (e.g., a microcontroller including internal storage, etc.). In some embodiments, the processor 670 and the storage 680 may be implemented in separate packages.

In some embodiments, the circuitry 600 may also include at least one hardware element 660 (hereinafter referred to simply as "hardware element" 660). The hardware element 660 may be configured to perform at least a portion of the functions the control circuitry 130 (FIG. 1), the signal circuitry 114 (FIG. 1), or a combination thereof, are configured to perform. By way of non-limiting example, the hardware element 660 may be configured to perform at least a portion of the functions of at least one of the controller 132 and the signal circuitry 114 (e.g., at least a portion of the functions discussed with reference to the method 400 of FIG. 4 and/or the method 500 of FIG. 5) of FIG. 1. In some embodiments, the hardware element 660 may include a System on Chip (SOC), an array of logic circuits configured to be programmable interfaced to perform functions of the circuitry 600 (e.g., a Field Programmable Gate Array (FPGA)), an Application Specific Integrated Circuit (ASIC), a system on chip (SOC), other hardware elements, and combinations thereof.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An antenna system, comprising:
  an antenna controller configured to operably couple to control inputs of an array of electromagnetic (EM) scattering elements having sub-wavelength spacing, the antenna controller configured to:
    control the array of EM scattering elements, through the control inputs, to operate according to modulation patterns;
    determine a performance parameter of the antenna system for a plurality of different combinations of different spatial holographic phases and effective mode indices, each of the plurality of different combinations having a different one of the modulation patterns corresponding thereto; and
    select one of the modulation patterns based, at least in part, on the performance parameter corresponding thereto.

2. The antenna system of claim 1, further comprising:
  a body configured to propagate an EM reference wave; and
  the EM scattering elements, wherein the EM scattering elements are configured to scatter the EM reference wave to produce an EM radiative wave.

3. The antenna system of claim 2, wherein the EM scattering elements are spaced at less than about one half of a wavelength of an operational frequency of the antenna system.

4. The antenna system of claim 2, wherein the EM scattering elements are spaced at less than about one fourth of a wavelength of an operational frequency of the antenna system.

5. The antenna system of claim 2, further comprising a feed configured to deliver the reference wave to the body.

6. The antenna system of claim 5, further comprising signal generating circuitry configured to operably couple to and deliver a signal to the feed, the signal configured to excite the reference wave on or in the body.

7. The antenna system of claim 2, wherein the EM scattering elements are arranged in a single one-dimensional arrangement.

8. The antenna system of claim 2, wherein the EM scattering elements are arranged in a plurality of one-dimensional arrangements.

9. The antenna system of claim 8, wherein the antenna controller is configured to analyze the effective mode indices as a combination of effective mode indices for each of the plurality of one-dimensional arrangements.

10. The antenna system of claim 2, wherein the antenna controller is configured to analyze the effective mode indices as a combination of effective mode indices for separate subgroups of the EM scattering elements of the array of EM scattering elements.

11. The antenna system of claim 1, wherein the antenna controller is configured to determine the performance parameter for the plurality of different combinations of different spatial holographic phases and effective mode indices while optimizing a loss parameter of the effective mode indices.

12. The antenna system of claim 1, wherein the antenna controller is configured to store, in a data storage device, data indicating the spatial holographic phase and the effective mode index that corresponds to the selected one of the modulation patterns.

13. The antenna system of claim 12, wherein the antenna controller is configured to store data indicating spatial holographic phase and effective mode index corresponding to the selected one of the modulation patterns for a plurality of different main beam directions from the array of EM scattering elements, and steer the main beam by operating the array of EM scattering elements in modulation patterns corresponding to the spatial holographic phase and the effective mode index corresponding to the plurality of different main beam directions.

14. The antenna system of claim 12, wherein the antenna controller is configured to store data indicating the selected one of the modulation patterns for a plurality of different main beam directions from the array of EM scattering elements, and steer the main beam by operating the array of EM scattering elements in the selected modulation patterns.

15. The antenna system of claim 1, wherein the antenna controller is configured to steer a main beam generated by the plurality of EM scattering elements based on the selected modulation pattern in at least substantially real-time.

16. The antenna system of claim 1, wherein the performance parameter is an antenna gain in a predetermined direction from the array of EM scattering elements.

17. The antenna system of claim 1, wherein the performance parameter is a gain of a highest-gain side lobe.

18. The antenna system of claim 1, wherein the performance parameter is a beamwidth of a main lobe of the antenna at half of a maximum gain of the main lobe.

19. The antenna system of claim 1, wherein the performance parameter is a received power received by the antenna system.

20. The antenna system of claim 1, wherein the performance parameter is a bit error rate of communications received by the antenna system.

21. The antenna system of claim 1, wherein the performance parameter is a data rate of communications received by the antenna system.

22. The antenna system of claim 1, wherein the performance parameter is a received signal to noise ratio of signals received by the antenna system.

23. The antenna system of claim 1, wherein the performance parameter is a uniformity with which a radiative wave is scattered by the array of EM scattering elements.

24. An antenna system, comprising:
a data storage device including a database stored thereon, the database including data indicating a modulation pattern determined based, at least in part, on a spatial holographic phase and an effective mode index of a body of an antenna for each of a plurality of different main beam angles from the antenna, the body including a plurality of electromagnetic (EM) scattering elements having sub-wavelength spacing; and
an antenna controller operably coupled to the data storage device and configured to operably couple to control inputs of the antenna and operate the antenna in modulation patterns, the antenna controller programmed to control the antenna to operate with a main beam pointed in each of the plurality of different main beam angles by controlling the antenna to operate in each modulation pattern corresponding to the plurality of different main beam angles as correlated in the database;
wherein the modulation pattern for each of the plurality of different main beam angles is selected, based at least in part, on a performance parameter of the antenna system for different combinations of the spatial holographic phase and the effective mode index.

25. The antenna system of claim 24, further comprising:
a body configured to propagate an EM reference wave; and
the EM scattering elements, wherein the EM scattering elements are configured to scatter the EM reference wave to produce an EM radiative wave.

26. The antenna system of claim 25, wherein the EM scattering elements are spaced at less than about one half of a wavelength of an operational frequency of the antenna system.

27. A method of operating an antenna system, the method comprising:
controlling an array of electromagnetic (EM) scattering elements having sub-wavelength spacing to operate according to modulation patterns;
determining a performance parameter of the antenna system for a plurality of different combinations of different spatial holographic phases and effective mode indices, each of the plurality of different combinations having a different one of the modulation patterns corresponding thereto; and
selecting one of the modulation patterns based, at least in part, on the performance parameter corresponding thereto.

28. The method of claim 27, further comprising:
propagating an EM reference wave with a body; and
scattering the EM reference with the EM scattering elements to produce an EM radiative wave.

29. The method of claim 28, wherein controlling an array of EM scattering elements comprises controlling the EM scattering elements that are spaced at less than about one half of a wavelength of an operational frequency of the antenna system.

30. The method of claim 28, wherein controlling an array of EM scattering elements comprises controlling the EM scattering elements that are spaced at less than about one fourth of a wavelength of an operational frequency of the antenna system.

31. The method of claim 28, further comprising delivering the reference wave to the body with a feed.

32. The method of claim 31, wherein delivering the reference wave to the body with a feed comprises delivering a signal to the feed, the signal configured to excite the reference wave on or in the body.

33. The method of claim 27, wherein controlling an array of EM scattering elements comprises controlling an array of EM scattering elements arranged in a single one-dimensional arrangement.

34. The method of claim 27, wherein controlling an array of EM scattering elements comprises controlling an array of EM scattering elements arranged in a plurality of one-dimensional arrangements.

35. The method of claim 34, further comprising analyzing the effective mode indices as a combination of effective mode indices for the plurality of one-dimensional arrangements.

36. The method of claim 27, further comprising analyzing the effective mode indices as a combination of effective mode indices for separate subgroups of the EM scattering elements of the array of EM scattering elements.

37. The method of claim 27, wherein determining a performance parameter of the antenna system comprises determining the performance parameter for the plurality of different combinations of different spatial holographic phases and effective mode indices while optimizing a loss parameter of the effective mode indices.

38. The method of claim 27, further comprising storing, in a data storage device, data indicating the spatial holographic phase and the effective mode index that corresponds to the selected one of the modulation patterns.

39. The method of claim 38, wherein storing data indicating the spatial holographic phase and the effective mode index that corresponds to the selected one of the modulation patterns comprises:
storing data indicating spatial holographic phase and effective mode index corresponding to the selected one of the modulation patterns for a plurality of different main beam directions from the array of EM scattering elements; and
steering the main beam by operating the array of EM scattering elements in modulation patterns corresponding to the spatial holographic phase and the effective mode index corresponding to the plurality of different main beam directions.

40. The method of claim 38, wherein storing data indicating the spatial holographic phase and the effective mode index that corresponds to the selected one of the modulation patterns comprises:
storing data indicating the selected one of the modulation patterns for a plurality of different main beam directions from the array of EM scattering elements; and
steering the main beam by operating the array of EM scattering elements in the selected modulation patterns.

* * * * *